United States Patent
Ishikawa et al.

(10) Patent No.: US 6,175,335 B1
(45) Date of Patent: Jan. 16, 2001

(54) DIELECTRIC LENS ANTENNA HAVING HEATING BODY AND RADIO EQUIPMENT INCLUDING THE SAME

(75) Inventors: Yohei Ishikawa, Kyoto; Koichi Sakamoto, Otsu; Hideaki Yamada, Ishikawa-gun; Fuminori Nakamura, Nagaokakyo, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/342,582

(22) Filed: Jun. 29, 1999

(30) Foreign Application Priority Data

Jun. 29, 1998 (JP) .................................. 10-182526

(51) Int. Cl.[7] ................................................. H01Q 1/02
(52) U.S. Cl. ............................................ 343/704; 343/753
(58) Field of Search ................................. 343/704, 753, 343/872, 911 L, 911 R; 392/420, 422, 426, 431

(56) References Cited

U.S. PATENT DOCUMENTS

| | | | |
|---|---|---|---|
| 4,972,197 | * 11/1990 | McCauley et al. | .................. 343/704 |
| 4,999,639 | * 3/1991 | Frazita et al. | ......................... 343/704 |
| 5,154,973 | * 10/1992 | Imagawa et al. | ..................... 428/325 |
| 5,172,024 | * 12/1992 | Broussoux et al. | .................. 310/323 |
| 5,617,107 | * 4/1997 | Fleming | ................................ 343/704 |
| 5,729,238 | * 3/1998 | Walton, Jr. | ........................... 343/704 |
| 5,861,855 | * 1/1999 | Arsenault et al. | .................... 343/704 |

FOREIGN PATENT DOCUMENTS

| | | |
|---|---|---|
| 2551366 | * 5/1977 | (DE) . |
| 19724320 | * 12/1998 | (DE) . |
| 0478852 | * 4/1992 | (EP) . |
| 0632522 | * 1/1995 | (EP) . |

OTHER PUBLICATIONS

Japanese Laid Open No. 9–191212 "Dielectric Lens and Its Manufacture" Jul. 1997.*

* cited by examiner

Primary Examiner—Tan Ho
(74) Attorney, Agent, or Firm—Ostrolenk, Faber, Gerb & Soffen, LLP

(57) ABSTRACT

A dielectric lens antenna having a lens comprising a dielectric material and a heating body disposed on a surface of the lens. The dielectric lens antenna has a snow-melting function, which prevents degradation in lens-efficiency.

26 Claims, 6 Drawing Sheets

FIG. 1A
FIG. 1B
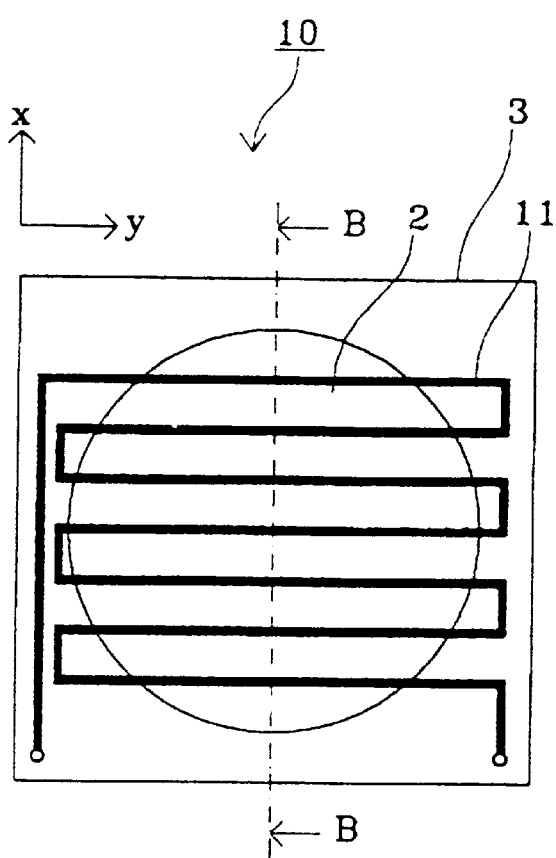
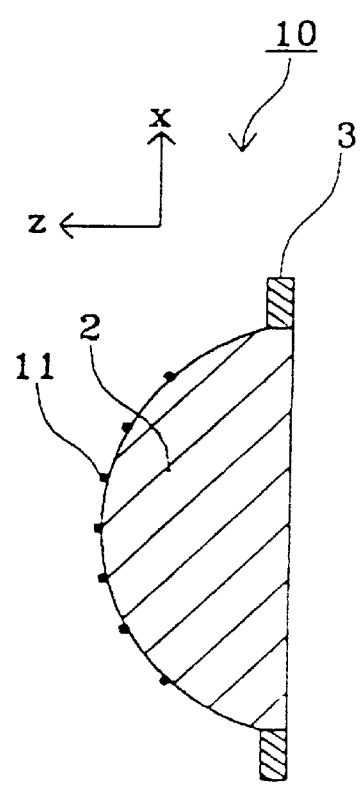

FIG. 8A
PRIOR ART
FIG. 8B
PRIOR ART
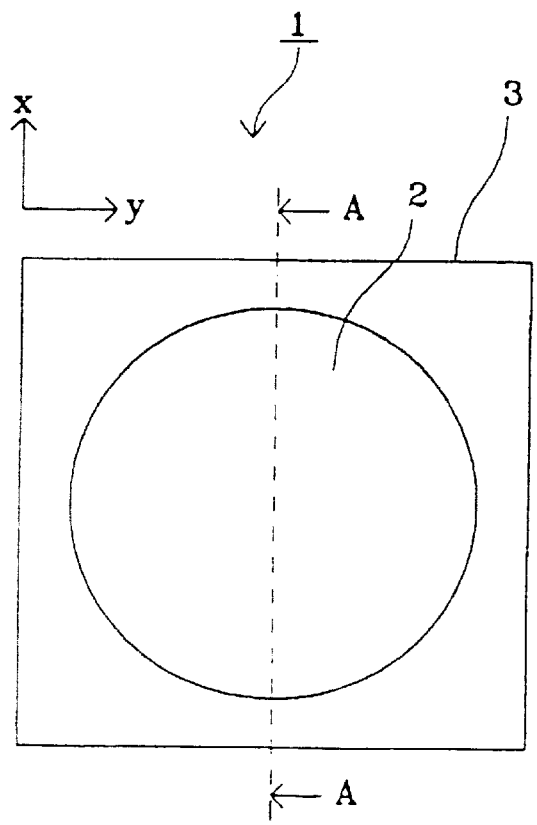
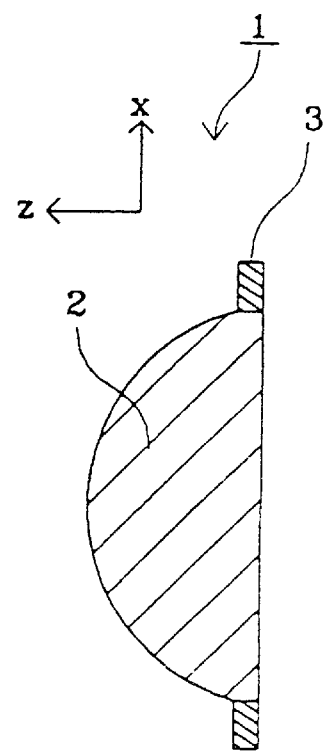

DIELECTRIC LENS ANTENNA HAVING HEATING BODY AND RADIO EQUIPMENT INCLUDING THE SAME

BACKGROUND OF THE INVENTION

1. Field of the Invention

The present invention relates to a dielectric lens antenna and radio equipment including the same. More specifically, the present invention relates to a dielectric lens antenna for use in a motor-vehicle-mounted radar, and radio equipment including the same.

2. Description of the Related Art

With the recent development of motor-vehicle-mounted radar, a dielectric lens antenna for use in a motor-vehicle-mounted radar has been required to be resistant to influences due to snowfall and snow accumulation.

FIG. 8 shows a conventional dielectric lens antenna. FIG. 8A is a plan view; FIG. 8B is a sectional view taken along the line A—A of FIG. 8A.

In FIG. 8, a dielectric lens antenna 1 has such an arrangement that a lens 2, whose material is dielectric, is attached to a frame 3 for retaining it. Other components such as a primary radiator are omitted, since they are not the primary constituents in the present invention.

The dielectric lens antenna 1 having such an arrangement is mounted in such a manner that the z-axis direction shown in FIG. 8 is oriented toward a direction in which the motor vehicle is headed. As a result, snow accumulates on a surface of the lens 2 of the motor vehicle when it runs in snow, so that this leads to deterioration in the efficiency of the dielectric lens antenna 1.

SUMMARY OF THE INVENTION

To overcome the above described problems, preferred embodiments of the present invention provide a dielectric lens antenna having a snow-melting function, which does not deteriorate the lens-efficiency, and radio equipment including the same.

One preferred embodiment of the present invention provides a dielectric lens antenna comprising: a lens comprising a dielectric material; and a heating body disposed on a surface of the lens.

Another preferred embodiment of the present invention provides a dielectric lens antenna comprising: a lens comprising a dielectric material; a matching layer disposed on a surface of the lens; and a heating body associated with the matching layer.

Yet another preferred embodiment of the present invention provides a dielectric lens antenna comprising: a lens comprising a dielectric material; a radome covering a surface of the lens; and a heating body associated with the radome.

In the above described dielectric lens antenna, the heating body may comprise a plurality of heating wires, the plurality of heating wires being disposed in a direction substantially perpendicular to a principal polarized wave of an electric wave passing through the lens.

The sectional area of the heating wires and the distances between the adjacent heating wires may be different depending on the place where they are disposed.

In the above described dielectric lens antenna, a sensor for measuring the amount of snow accumulated on the periphery of the heating body and a controller for controlling the heating value of the heating body according to the amount of the accumulated snow may be equipped therewith.

Yet another preferred embodiment of the present invention provides radio equipment including the above described dielectric lens antenna.

Other features and advantages of the present invention will become apparent from the following description of the invention which refers to the accompanying drawings.

BRIEF DESCRIPTION OF THE DRAWING(S)

FIG. 1A and FIG. 1B are views of a dielectric lens antenna according to one preferred embodiment of the present invention; FIG. 1A is a plan view, and FIG. 1B is a sectional view taken along the line B—B of FIG. 1A.

FIG. 2A is a plan view, and FIG. 2B is a sectional view taken along the line C—C of FIG. 2A.

FIG. 3A is a plan view, and FIG. 3B is a sectional view taken along the line D—D of FIG. 3A.

FIG. 8A and FIG. 8B show a conventional dielectric lens antenna; FIG. 8A is a plan view and FIG. 8C is a sectional view taken along the line A—A of FIG. 8A.

DETAILED DESCRIPTION OF EMBODIMENTS OF THE INVENTION

FIG. 1A and FIG. 1B are views of a dielectric lens antenna according to one preferred embodiment of the present invention. In FIG. 1A and FIG. 1B, other components such as a primary radiator are omitted since they are not the principal constituents of the present invention. In the dielectric lens antenna 10 shown in FIGS. 1A and 1B, a heating body 11 formed by connecting a plurality of linear heating wires in series is disposed on a surface of a lens 2 whose material is dielectric. Preferably, a metal wire with a large electric resistance, such as a Nichrome wire, is used as each of the heating wires.

In this case, as a method for forming the heating body, when a lens is formed by injection molding, an integrated molding is possible by disposing Nichrome wires in a metal mold. When the lens is ceramic, it is possible to form by printing and baking a pasty heating body on the surface of the lens.

In the dielectric lens antenna 10 formed in such a manner, current is fed to the heating body 11 as required in snowfall and snow accumulation. Heat generated in the heating body 11 can melt snow which has accumulated on the surface of the lens 2 of the dielectric lens antenna 10.

In such a manner, formation of the heating body 11 on the surface of the lens 2 allows the surface of the lens 2 to be resistant to the accumulation of snow thereon so as to prevent degradation in the efficiency of the dielectric lens antenna 10 in snowfall. The heat generated in the heating body 11 almost never affects system sections (not shown) such as a primary radiator disposed inside the lens 2, since the lens 2 also serves as a heat insulator.

Figure 2A:
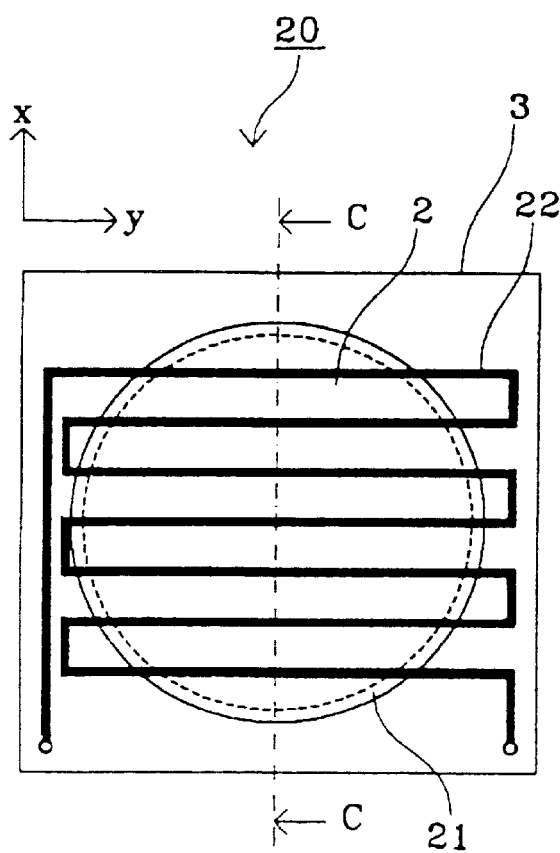
FIG. 2A and FIG. 2B are views of a dielectric lens antenna according to another preferred embodiment of the present invention.
Figure 2B:
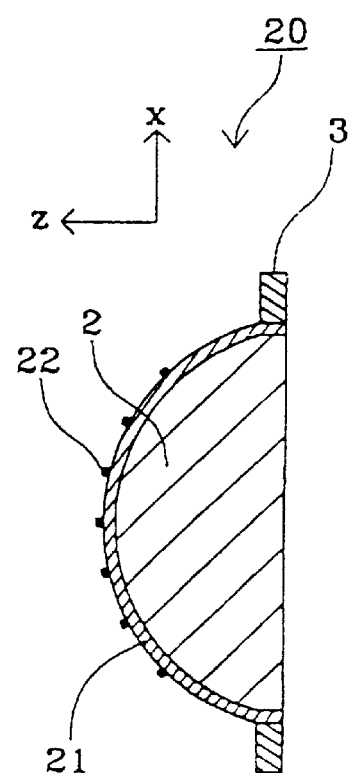

FIGS. 2A and 2B show a dielectric lens antenna according to another preferred embodiment of the present invention. In the dielectric lens antenna 20 shown in FIG. 2, a matching layer 21 for controlling reflection of an electric wave on a surface of the lens is formed on the surface of the lens 2; and a heating body 22 composed of a plurality of heating wires is formed on a surface of the matching layer 21. Current is fed to the heating body 22 as required in snowfall and during snow accumulation. Consequently, heat generated in the heating body 22 can melt the snow which has accumulated on the surface of the matching layer 21 formed on the lens 2 of the dielectric lens antenna 20.

As described above, formation of the heating body 22 on the surface of the matching layer 21 formed on the lens 2 allows the surface of the matching layer 21 to be resistant to the accumulation of snow thereon so as to prevent degradation in the efficiency of the dielectric lens antenna 20 in snowfall.

In the dielectric lens antenna 20 shown in FIGS. 2A and 2B, the heating body 22 is formed on the surface of the matching layer 21. However, the heating body may be embedded inside the matching layer so as to obtain similar operational advantages. When the heating body is embedded inside the matching layer, durability of the heating body can be enhanced since the matching layer covers the heating body for protection.

Figure 3A:
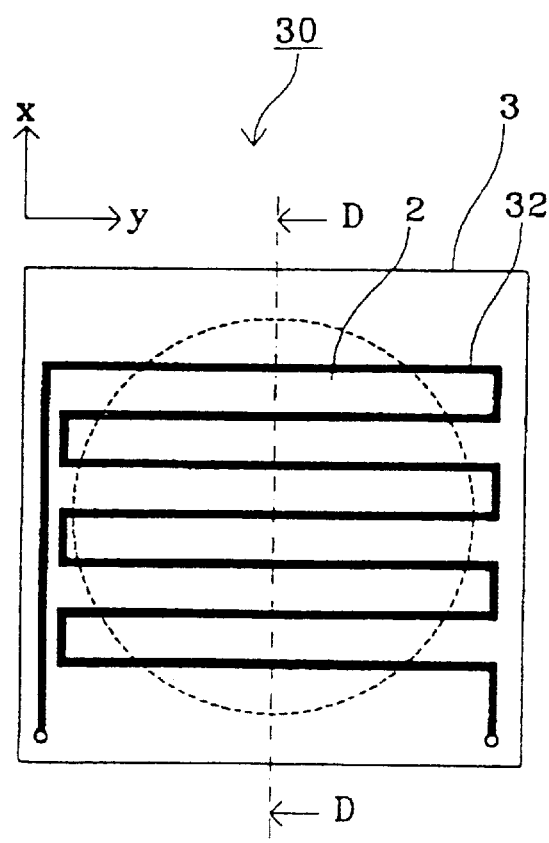
FIG. 3A and FIG. 3B show views of a dielectric lens antenna according to yet another preferred embodiment of the present invention.
Figure 3B:
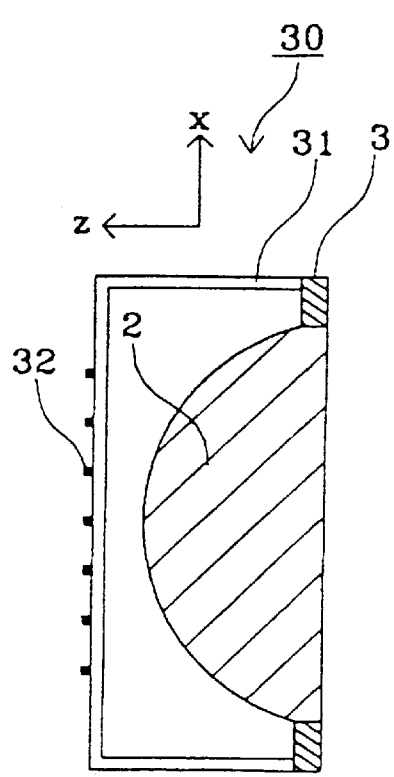

FIG. 3A and FIG. 3B show a dielectric lens antenna according to yet another embodiment of the present invention. In the dielectric lens antenna 30 shown in FIG. 3, a radome 31 is disposed for covering the surface of the lens 2; and a heating body 32 comprising a plurality of heating wires is formed on the surface of the radome 31. Current is fed to the heating body 32 as required in snowfall and during snow accumulation. As a result, heat generated in the heating body 32 can melt snow, which has accumulated on the surface of the radome 31 of the dielectric lens antenna 30.

Formation of the heating body 32 on the surface of the radome 31 allows the surface of the radome 31 to be resistant to the accumulation of snow thereon so as to prevent degradation in the efficiency of the dielectric lens antenna 30 in snowfall.

In the dielectric lens antenna 30 shown in FIGS. 3A and 3B, the heating body 32 is formed on the surface of the radome 31. However, the heating body may be embedded inside a material such as resin for forming a radome so as to obtain similar operational advantages. When the heating body is embedded inside the material for forming a radome, durability of the heating body can be increased, since the radome covers the heating body for protection.

Figure 4:
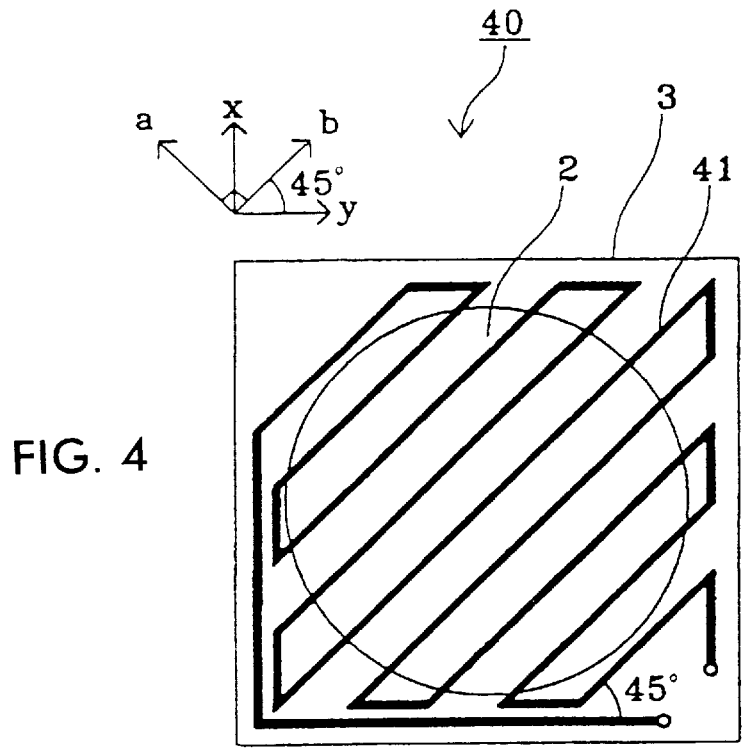
FIG. 4 is a plan view of a dielectric lens antenna according to yet another preferred embodiment of the present invention.

FIG. 4 shows a plan view of a dielectric lens antenna according to yet another embodiment of the present invention. In the dielectric lens antenna 40 shown in FIG. 4, a heating body 41 comprising a plurality of heating wires is formed on the surface of the lens 2 in such a manner that each of the heating wires is disposed in the direction of an arrow b, which is inclined 45 degrees toward the y-axis direction. The dielectric lens antenna 40 is used with respect to an electric wave in which the electric-field direction of a principal polarized wave is oriented toward the direction of an arrow a which is perpendicular to the direction of the arrow b. In other words, in the dielectric lens antenna 40, a plurality of heating wires in the heating body 41 is formed along the direction perpendicular to the direction of the principal polarized wave of the electric wave passing through the lens 2.

In this way, by forming a plurality of heating wires in the heating body 41 along the direction perpendicular to the direction of the principal polarized wave of an electric wave passing through the lens 2 of the dielectric lens antenna 40, the heating body 41 almost never inhibits the passing of a principal polarized wave. In contrast, with respect to a cross polarization, which is perpendicular to the principal polarized wave and is an unnecessary polarized wave, the direction of a polarized wave and the direction in which a plurality of heating wires in the heating body 41 is formed is the same. Thus, the cross polarization is reflected or absorbed by the heating body 41 so that it is unlikely to pass through the lens 2. Accordingly, this permits the cross-polarization characteristics of the dielectric lens antenna 40 to be enhanced, (namely, the cross polarization is allowed to be smaller than the principal polarized wave of the electric wave which has passed through the dielectric lens antenna 40); and, for example, when the antenna is used in a motor-vehicle-mounted radar, errors in measurement and misidentification can be prevented.

Although each of the heating wires are connected in series to form the heating body in the above-described respective embodiments, the arrangement should not be limited to series connection; and parallel connection is also applicable so as to create similar operational advantages. Moreover, in the case of parallel connection, even if one of the heating wires is broken, snow-melting function can be maintained although the overall efficiency is deteriorated.

Figure 5:
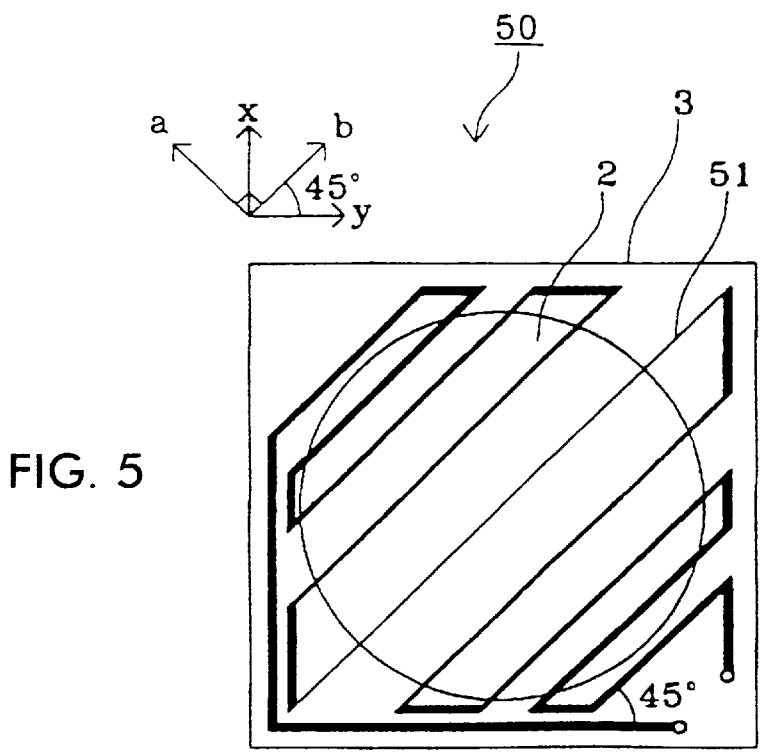
FIG. 5 is a plan view of a dielectric lens antenna according to yet another preferred embodiment of the present invention.

FIG. 5 shows a dielectric lens antenna according to yet another preferred embodiment of the present invention. In a dielectric lens antenna 50 shown in FIG. 5, the heating body 51 comprising a plurality of heating wires formed on the surface of the lens 2 by disposing the heating wires along the direction of an arrow b which is inclined 45 degrees with respect to the y-axis direction. In addition, the heating wires are disposed in such a manner that the widths of them and the distances between them are different depending on the place of disposition. In other words, the widths of the heating wires running across the part near the center of the lens 2 are narrowed, whereas the widths of the heating wires running across only the edge of the lens 2 are broadened. The distances between the mutually adjacent heating wires are broadened when they are formed running across the parts near the center of the lens 2, and the distances between them are formed to be narrower as they run across the parts closer to the edge of the lens 2 and farther from the center of the same.

In the dielectric lens antenna, the closer to the center of the lens, the higher the energy density of an electric wave, whereas the farther from the center, the lower the energy density. Thus, the closer to the center of the lens, the larger the efficiency-degradation rate of the lens due to an obstacle such as a heating body.

Accordingly, as shown in the dielectric lens antenna 50, at the parts near the center of the lens 2, the distance between the mutually adjacent heating wires is formed to be broader so as not to inhibit passing of an electric wave. In contrast, the distance between the heating wires is formed to be narrower as they are farther from the center of the lens 2 to be closer to the edge. When the distance between the mutually adjacent heating wires is broader near the center of the lens 2, snow-melting effect is reduced if the heating values of the respective heating wires are the same. Thus, near the center of the lens 2, the width of the heating wire is formed to be narrower to increase resistance so as to increase the heating value with respect to the equivalent current, whereas as the heating wire is farther from the center of the lens, the broader the width of the heating wire, the narrower the distance between the mutually adjacent ones so as to reduce the heating value, so that the overall balance between the lens efficiency and the snow-melting effect can be kept.

Figure 6:
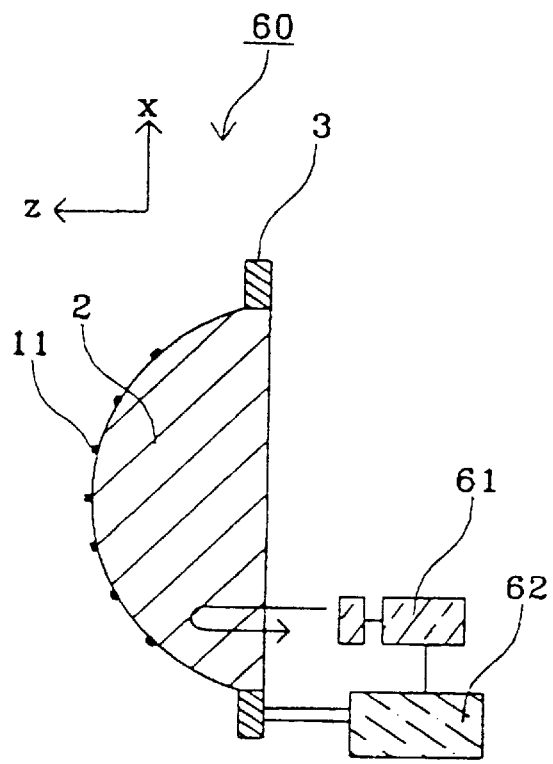
FIG. 6 is a sectional view of a dielectric lens antenna according to yet another preferred embodiment of the present invention.

FIG. 6 shows a dielectric lens antenna according to yet another preferred embodiment of the present invention. In FIG. 6, the dielectric lens antenna 60 comprises a sensor 61 for measuring the amount of snow which has accumulated on the periphery of the heating body formed on the surface of the lens 2 and a controller 62 for controlling the heating value of the heating body 11 according to the amount of snow which has accumulated.

Such an arrangement of the dielectric lens antenna 60 permits control of the heating value of the heating body 11 according to the amount of snow which has accumulated; and it also permits suppression of excessive heat of the heating body so that it can efficiently melt snow at a high speed.

The arrangement in which a dielectric lens antenna comprises a sensor and a controller should not be limited to the combination of those units with the dielectric lens antenna 10 shown in FIGS. 1A and 1B. It is also possible to obtain similar operational advantages by the combination of those units with the respective dielectric lens antennas shown in FIGS. 2A through 5.

Although the heating body is formed on the front side (the external side) of the lens in the above-described embodiments, it is also possible to form the heating body on the back (the side for disposing a primary radiator, namely, the internal side). In this case, it is possible to obtain the advantage in which condensation on the back of the lens can be prevented in the case of a low temperature and a high humidity.

Figure 7:
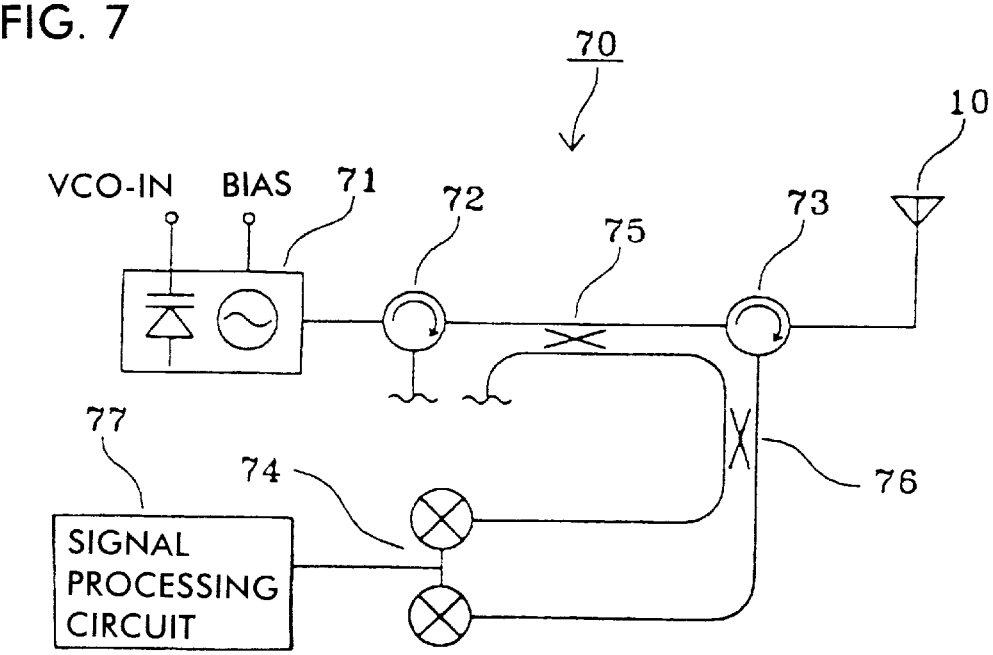
FIG. 7 is a block diagram of radio equipment according to yet another preferred embodiment of the present invention.

FIG. 7 shows a block diagram of millimeter-wave radar equipment for mounting in a motor-vehicle as an embodiment of radio equipment of the present invention. In FIG. 7, the millimeter-wave radar equipment 70 comprises a dielectric lens antenna 10, an oscillator 71, circulators 72 and 73, a mixer 74, couplers 75 and 76, and a signal processing circuit 77.

In the millimeter-wave radar equipment 70 having such an arrangement, the oscillator 71 has a structure of a voltage-controlled oscillator in which a Gunn diode is used as an oscillation device and a varactor diode is used as an oscillation-frequency control device. Bias voltage with respect to the Gunn diode and control voltage VCO-IN for frequency-modulation are input to the oscillator 71; and a transmitting signal, which is the output, is input to the coupler 75 through the circulator 72 so that a reflection signal does not return. The coupler 75 divides the transmitting signal into two signals to emit one of the signals from the dielectric lens antenna 10 through the circulator 73 and input the other one as a local signal to a coupler 76. Meanwhile, the signal received in the dielectric lens antenna 10 is input to the coupler 76 through the circulator 73. The coupler 76 acts as a 3 dB-directivity coupler to divide the local signal transmitted from the coupler 75 into equal parts by a phase difference of 90 degrees so as to input to two mixer circuits of the mixer 74; and it also divides the receiving signal transmitted from the circulator 73 into equal parts by a phase difference of 90 degrees to input to two mixer circuits of the mixer 74. The mixer 74 performs balance-mixing of the two signals in which the local signal and the receiving signal are mixed so as to output the frequency-difference element between the local signal and the receiving signal as an IF signal and input it to the signal-processing circuit 77.

In the above millimeter-wave radar equipment 70, for example, providing a triangular-wave signal as the VCO-IN signal permits obtaining of distance information and relative velocity information from the IF signal by the signal-processing circuit 77. Accordingly, when this radar is mounted in a motor vehicle, the relative distance and the relative velocity with respect to other motor vehicles can be measured. In addition, using the dielectric lens antenna of the present invention can prevent malfunctions due to degradation in the antenna efficiency in snowfall.

While the invention has been particularly shown and described with reference to preferred embodiments thereof, it will be understood by those skilled in the art that the forgoing and other changes in form and details may be made therein without departing from the spirit of the invention.

According to the above described dielectric lens antenna, the accumulation of snow on the dielectric lens antenna is prevented, and thereby degradation in the efficiency in snowfall is prevented.

Disposing the heating wires along the direction substantially perpendicular to the principal polarized wave of an electric wave passing through the lens permits cross polarization to be prevented without inhibiting the principal polarized wave, so that the cross-polarization characteristics of the dielectric lens antenna can be improved.

Moreover, near the center of the lens, the sectional area of the heating wire is formed to be smaller, whereas the distance between the adjacent heating wires is formed to be broader; and near the edge of the lens, the sectional area is formed to be larger, whereas the distance is formed to be narrower so as to prevent degradation in the efficiency of the dielectric lens antenna.

A sensor for measuring the amount of snow which has accumulated on the periphery of the heating body and a controller for controlling the heating value of the heating body according to the amount of the snow which has accumulated are disposed so as to suppress excessive heat of the heating body and to effectively melt snow with a high speed.

The radio equipment of the present invention including the dielectric lens antenna of the present invention can prevent malfunctions in snowfall.

Other features and advantages of the present invention will become apparent from the following description of preferred embodiments of the invention which refers to the accompanying drawings, wherein like reference numerals indicate like elements to avoid duplicative description.

What is claimed is:

1. A dielectric lens antenna comprising:
   a lens comprising a dielectric material; and
   a heating body disposed on a surface of the lens, and further wherein
   the lens is attached to a frame;
   the heating body comprises a plurality of heating wires;
   the plurality of heating wires are disposed on the surface of the lens and the frame;
   the heating wires having a width the width of the heating wires running across a part near the center of the lens being narrowed, whereas the width of the heating wires running across on an edge of the lens and on the surface of the frame are broadened; and a distance between mutually adjacent heating wires at the part near the center of the lens is formed to be broader, whereas a distance between mutually adjacent heating wires is formed to be narrower as the heating wires are farther from the center of the lens.

2. The dielectric lens antenna according to claim 1 wherein:

the heating body comprises a plurality of heating wires, the plurality of heating wires being disposed in a direction substantially perpendicular to a principal polarized wave of an electric wave passing through the lens.

3. The dielectric lens antenna according to claim 2, wherein a sectional area of the heating wires and distances between adjacent heating wires are different depending on the place where they are disposed.

4. The dielectric lens antenna according to claim 3, further comprising a sensor for measuring an amount of snow accumulated on a periphery of the heating body and a controller for controlling a heating value of the heating body according to the amount of the accumulated snow.

5. The dielectric lens antenna according to claim 2, further comprising a sensor for measuring an amount of snow accumulated on a periphery of the heating body and a controller for controlling a heating value of the heating body according to the amount of the accumulated snow.

6. The dielectric lens antenna according to claim 1, further comprising a sensor for measuring an amount of snow accumulated on a periphery of the heating body and a controller for controlling a heating value of the heating body according to the amount of the accumulated snow.

7. A dielectric lens antenna comprising:

a lens comprising a dielectric material;

a matching layer disposed on a surface of the lens; and a heating body associated with the matching layer; and further wherein the lens is attached to a frame;

the heating body comprises a plurality of heating wires;

the plurality of heating wires are disposed on the surface of the lens and the frame;

the heating wires having a width the width of the heating wires running across a part near the center of the lens being narrowed, whereas the width, of the heating wires running across on an edge of the lens and on the surface of the frame are broadened; and a distance between mutually adjacent heating wires at the part near the center of the lens is formed to be broader, whereas a distance between mutually adjacent heating wires is formed to be narrower as the heating wires are farther from the center of the lens.

8. The dielectric lens antenna according to claim 7 wherein:

the heating body comprises a plurality of heating wires, the plurality of heating wires being disposed in a direction substantially perpendicular to a principal polarized wave of an electric wave passing through the lens.

9. The dielectric lens antenna according to claim 8, wherein a sectional area of the heating wires and distances between adjacent heating wires are different depending on the place where they are disposed.

10. The dielectric lens antenna according to claim 9, further comprising a sensor for measuring an amount of snow accumulated on a periphery of the heating body and a controller for controlling a heating value of the heating body according to the amount of the accumulated snow.

11. The dielectric lens antenna according to claim 8, further comprising a sensor for measuring an amount of snow accumulated on a periphery of the heating body and a controller for controlling a heating value of the heating body according to the amount of the accumulated snow.

12. The dielectric lens antenna according to claim 7, further comprising a sensor for measuring an amount of snow accumulated on a periphery of the heating body and a controller for controlling a heating value of the heating body according to the amount of the accumulated snow.

13. A dielectric lens antenna comprising:

a lens comprising a dielectric material;

a radome covering a surface of the lens;

a heating body associated with the radome; and further wherein the lens is attached to a frame;

the heating body comprises a plurality of heating wires;

the plurality of heating wires are disposed on the surface of the lens and the frame;

the heating wires having a width, the width of the heating wires running across a part near the center of the lens being narrowed, whereas the width of the heating wires running across on an edge of the lens and on the surface of the frame are broadened; and a distance between mutually adjacent heating wires at the part near the center of the lens is formed to be broader, whereas a distance between mutually adjacent heating wires is formed to be narrower as the heating wires are farther from the center of the lens.

14. The dielectric lens antenna according to claim 13 wherein:

the heating body comprises a plurality of heating wires, the plurality of heating wires being disposed in a direction substantially perpendicular to a principal polarized wave of an electric wave passing through the lens.

15. The dielectric lens antenna according to claim 14, wherein a sectional area of the heating wires and distances between adjacent heating wires are different depending on the place where they are disposed.

16. The dielectric lens antenna according to claim 15, further comprising a sensor for measuring an amount of snow accumulated on a periphery of the heating body and a controller for controlling a heating value of the heating body according to the amount of the accumulated snow.

17. The dielectric lens antenna according to claim 14, further comprising a sensor for measuring an amount of snow accumulated on a periphery of the heating body and a controller for controlling a heating value of the heating body according to the amount of the accumulated snow.

18. The dielectric lens antenna according to claim 13, further comprising a sensor for measuring an amount of snow accumulated on a periphery of the heating body and a controller for controlling a heating value of the heating body according to the amount of the accumulated snow.

19. Radio equipment comprising:

a transmitter and receiver, the transmitter and receiver being coupled to an antenna, the antenna comprising a lens comprising a dielectric material; and a heating body disposed on a surface of the lens; and further wherein the lens is attached to a frame;

the heating body comprises a plurality of heating wires;

the pluraliy of heating wires are disposed on the surface of the lens and the frame;

the heating wires having a width, the width of the heating wires running across a part near the center of the lens being narrowed whereas, the width of the heating wires running across on an edge of the lens and on the surface of the frame are broadened; and a distance between mutually adjacent heating wires at the part near the center of the lens is formed to be broader, whereas a distance between mutually adjacent heating wires is formed to be narrower as the heating wires are farther from the center of the lens.

20. The radio equipment of claim 19 wherein the heating body comprises a plurality of heating wires, the plurality of heating wires being disposed in a direction substantially perpendicular to a principal polarized wave of an electric wave passing through the lens.

21. The radio equipment of claim 20, wherein a sectional area of the heating wires and distances between adjacent heating wires are different depending on the place where they are disposed.

22. The radio equipment of claim 19, further comprising a sensor for measuring an amount of snow accumulated on a periphery of the heating body and a controller for controlling a heating value of the heating body according to the amount of the accumulated snow.

23. Radio equipment comprising:

a transmitter and receiver, the transmitter and receiver being coupled to an antenna, the antenna comprising a lens comprising a dielectric material;

a matching layer disposed on a surface of the lens; and a heating body associated with the matching layer; and further wherein the lens is attached to a frame;

the heating body comprises a plurality of heating wires;

the plurality of heating wires are disposed on the surface of the lens and the frame;

the heating wires having a width, the width of the heating wires running across a part near the center of the lens being narrowed, whereas the width of the heating wires running across on an edge of the lens and on the surface of the frame are broadened; and a distance between mutually adjacent heating wires at the part near the center of the lens is formed to be broader, whereas a distance between mutually adjacent heating wires is formed to be narrower as the heating wires are farther from the center of the lens.

24. The radio equipment of claim 23 wherein the heating body comprises a plurality of heating wires, the plurality of heating wires being disposed in a direction substantially perpendicular to a principal polarized wave of an electric wave passing through the lens.

25. The radio equipment of claim 24, wherein a sectional area of the heating wires and distances between adjacent heating wires are different depending on the place where they are disposed.

26. The radio equipment of claim 23, further comprising sensor for measuring an amount of snow accumulated on a periphery of the heating body and a controller for controlling heating value of the heating body according to the amount of the accumulated snow.

\* \* \* \* \*